US006149074A

United States Patent [19]

Friedel et al.

[11] Patent Number: 6,149,074

[45] Date of Patent: Nov. 21, 2000

[54] DEVICE FOR COOLING OR HEATING A CIRCULAR HOUSING

[75] Inventors: Jérôme Friedel, Blandy les Tours; Patrick Didier Michel Lestoille, Saint Maur; Christophe Schultz, Eragny S/Oise; Jean-Luc Soupizon, Vaux le Penil; Jean Bernard Vache, Grigny, all of France

[73] Assignee: Societe Nationale d'Etude et de Construction de Moteurs d'Aviation "SNECMA", Paris, France

[21] Appl. No.: 09/147,829

[22] PCT Filed: Jul. 17, 1998

[86] PCT No.: PCT/FR98/01572

§ 371 Date: Mar. 16, 1999

§ 102(e) Date: Mar. 16, 1999

[87] PCT Pub. No.: WO99/04142

PCT Pub. Date: Jan. 28, 1999

[30] Foreign Application Priority Data

Jul. 18, 1997 [FR] France .................................. 97 09137

[51] Int. Cl.[7] .................................................. B64D 33/04

[52] U.S. Cl. ......................... 239/127.1; 60/266; 415/175; 165/169

[58] Field of Search ............................ 165/169; 415/175, 415/177, 178; 239/127.1, 127.3; 60/39.5, 266, 39.83

[56] References Cited

U.S. PATENT DOCUMENTS

| | | | |
|---|---|---|---|
| 2,402,841 | 6/1946 | Ray . | |
| 2,801,821 | 8/1957 | Burger | 415/175 |
| 3,218,799 | 11/1965 | Lovingham | 239/127.1 |
| 4,019,320 | 4/1977 | Redinger, Jr. et al. . | |
| 4,280,792 | 7/1981 | Hartel et al. . | |
| 4,412,782 | 11/1983 | Monserrat | 415/175 |
| 4,525,998 | 7/1985 | Schwarz | 60/266 |
| 4,643,638 | 2/1987 | Laurello | 415/136 |
| 5,399,066 | 3/1995 | Ritchie et al. . | |
| 6,035,929 | 3/2000 | Friedel et al. | 165/168 |

FOREIGN PATENT DOCUMENTS

| | | |
|---|---|---|
| 0 492 865 | 7/1992 | European Pat. Off. . |
| 0 541 325 | 5/1993 | European Pat. Off. . |
| 0 559 420 | 9/1993 | European Pat. Off. . |

*Primary Examiner*—Charles G. Freay
*Attorney, Agent, or Firm*—Oblon, Spivak, McClelland, Maier & Neustadt, P.C.

[57] ABSTRACT

The housing is heated or cooled to adjust its diameter and, in particular, the play between the tips of the rotor blades and the housing. The apparatus consists of networks of tubes (1) covering complementary portions of the circumference of the housing and consisting of a pair of distributors (3) and parallel tubes (2) between said distributors, said tubes (2) being alternately connected to one or other of the distributors and provided with apertures to blow the gas onto the housing. The counter-flow circulation in the tubes (2) makes it possible to supply both gas that has been greatly heated by traveling a considerable distance through the tubes (2) and cooler gas that has traveled less far in other tubes (2) to any point on the housing, thereby balancing out the heat applied to every portion of the housing.

4 Claims, 4 Drawing Sheets

DEVICE FOR COOLING OR HEATING A CIRCULAR HOUSING

CROSS-REFERENCE TO RELATED APPLICATIONS

The present application is a 35 U.S.C. §371 national stage application of the PCT application.

BACKGROUND OF THE INVENTION

1. Field of the Invention

The present invention relates to a cooling or heating apparatus for a circular housing.

2. Description of the Background

There is currently a widespread need to improve engine outputs. In the aeronautics sector one way of achieving this is to reduce the play between rotor and stator to the minimum, particularly in the region where the free ends of the rotating blades of the rotor meet the housing surfaces facing them. Means to achieve this have already been designed, particularly by varying the diameter of the housing. The commonest procedure consists in imposing thermally-induced dilations or contractions on the outer surface of the housing by blowing gas at the required temperature taken from other sections of the machine in the area opposite the gas exhaust pipe, thereby heating or cooling the housing as required.

It is, however, vital that the temperature of the entire surface of the housing has a high degree of uniformity. A known apparatus consists in fitting two networks of semi-circular tubes around the housing such that each network covers one half of the circumference of the housing and is in turn connected to a distribution unit supplied by a pipe connected to each tube of the network at its mid-point. The gas is thus dispersed through the tubes of the network, travelling from the middle of each tube to its end. It leaves the tubes via. apertures directed at the housing. This configuration explains why the tubes are known as "shower collars".

Although it is true that this type of apparatus blows gas more or less uniformly over the entire outer surface of the housing, it nevertheless fails to give it a uniform diameter because the gas heats as it travels through the tubes and may therefore give up more heat on arrival at the ends of the tubes than near to the distributor units. Moreover, the housing gets hotter away from the surfaces near the distributor units and therefore assumes an ovoid shape, the largest diameter of which is located at the surfaces where the network or tubes interconnect.

SUMMARY OF THE INVENTION

The apparatus of the invention aims to heat or cool a circular cross-section housing much more uniformly. Like the known apparatus, it comprises a gas distribution network in distributors that connect to networks of tubes surrounding the housing on respective sections of the circumferences. Instead of a distributor being connected to the middle of the tube networks, two distributors are disposed at the ends of the networks, each distributor connecting to a group of tubes of the network concerned. The gas passes through the two groups of tubes in opposite directions; this balances the supply of heat to the circumference, each surface of the housing being subject to a dual supply of gas, the first of which, supplied by one of the network tube groups is as hot as the other, supplied by the other group, is cold.

There are therefore twice as many distributors as networks of tubes, each consecutive pair of tube networks having two adjacent distributors. Under these circumstances, it is advantageous to have a single gas distribution pipe feeding the two distributors of the pairs at the same time, provided the distributors can be connected satisfactorily to the distributors which may be subject to unforeseen displacements due to distortions caused by the heat. They are connected by a sleeve whose ends are in the shape of an open sphere that slides in bushes delimiting the distributors and fitted with end-stops limiting the movement of the sleeve.

The pipes feeding into a pair of distributors are butt-welded to a connection pipe that occupies half their cross-section and extends as far as at least one of the bushes passing through a stop face of the said bush. This pipe penetrates slightly into the wider pipe of the distribution network, collects half the gas flow leaving it and carries this half to the distributor located beyond the connecting bush. The other half of the gas flow leaves the distribution pipe around the connecting bush and enters the other distributor. The connecting bush has a half-section smaller than that of the connecting bush to which it is connected with play, thereby completing the apparatus whose purpose is to equalize heating or cooling.

A possible improvement consists in providing the apparatus with a heating or cooling gas control valve that is controlled by a computer depending on the speeds reached by the machine. In the chief situation to which the invention may be applied in which cold gas is blown onto the housing, it is particularly advantageous to reduce the gas flow rate during startup. If too high a rate is supplied when the machine is still cold, the housing heats much more slowly than the rotor and its blades; the tips of the blades may dilate to the point where they rub against the inner surface of the housing. This surface is usually coated with a layer of a soft material, described as abradable, that is eroded by the friction, thereby avoiding damage to blades of the rotor. However, the play that is created between the blades and the abradable layer increases when the housing is heated and dilated; this situation should therefore be avoided.

BRIEF DESCRIPTION OF THE DRAWING

The invention will now be described in detail with reference to the attached figures that are given as non-limitative examples.

DESCRIPTION OF THE PREFERRED EMBODIMENT

Figure 1:
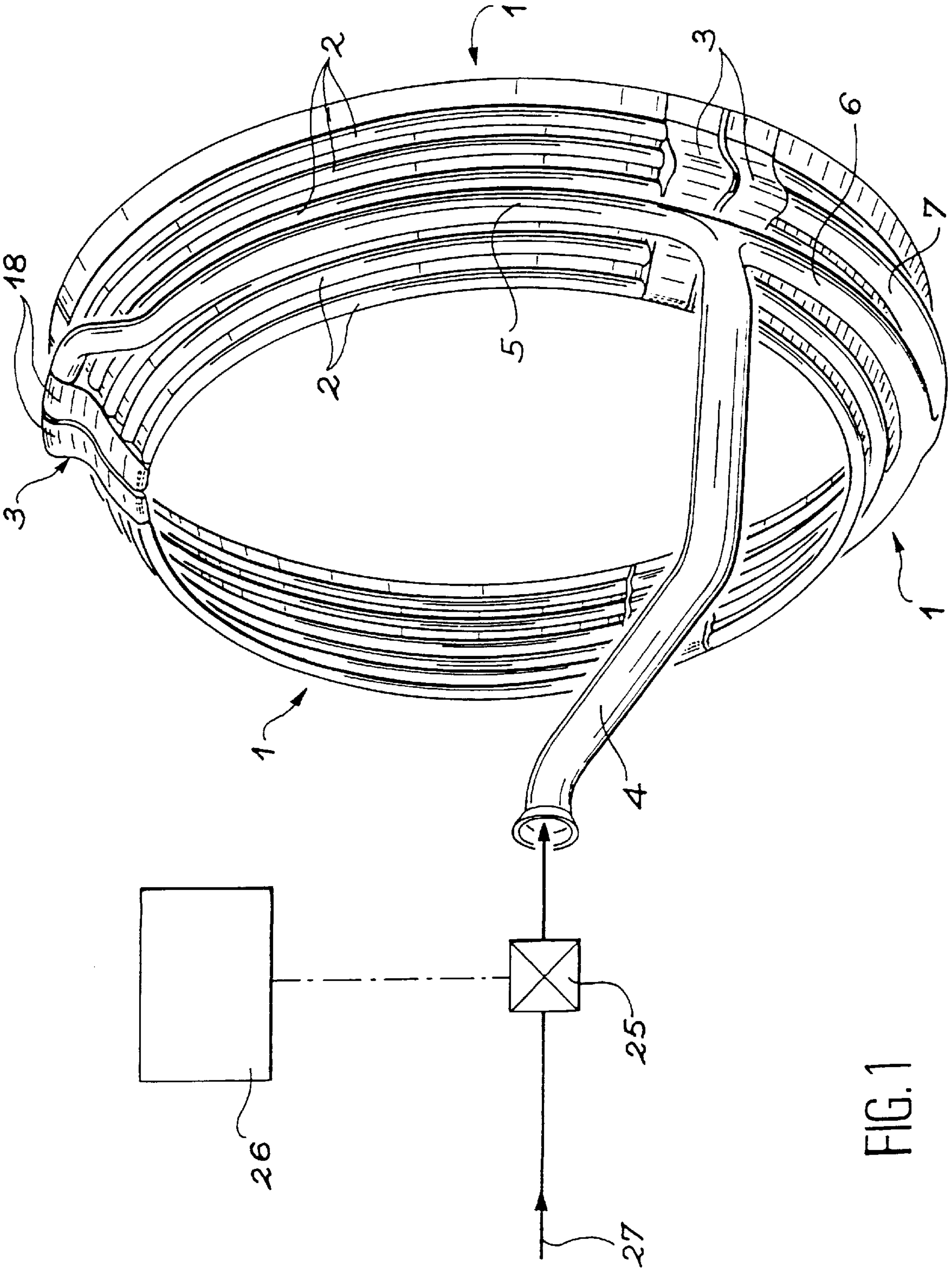
FIG. 1 is a general view of the apparatus.

The complete apparatus as shown in FIG. 1 is roughly crown-shaped; it should be imagined placed around a cylindrical or conical housing represented elsewhere. The crown consists essentially of three identical networks of tubes 1, each of which runs around one third of the circumference of the housing, thereby forming a virtually continuous surface. Each of the networks of tubes 1 comprises six tubes 2 that are parallel to one another and run from one network to the next. The ends of these tubes 2 fit into distributor units 3 to give three adjacent pairs of distributor units 3 located on the ends of the three networks of tubes 1. The distributor units 3 and the tubes 2 are supplied with heating or cooling gas via a network of pipes consisting firstly of a single pipe 4 that splits into a first pipe 5 that runs to a first pair of distributor units 3, shown at the top of the figure, and a second pipe 6 that itself splits into two pipes, one of which 7 runs along the lower right-hand side of the figure and supplies a second pair of distributor units 3 located in this region. The other pipe is not visible in the figure but it runs behind one of the networks of tubes 1 and connects with the third pair of distributor units 3 that is also invisible but located behind the lower left-hand side of the figure. The pipes are dimensioned so that the three pairs of distributor units 3 receive identical flow-rates of gas at the same temperature. The lengths of piping the gas needs to travel through to reach each pair of distributor units are all the same; single pipe 4 splits at the junction of two networks of tubes 1 and pipe 6 splits in the middle of one of the two networks of tubes 1. Pipe 5 runs around approximately one third of the circumference of the housing; pipe 6, like the two pipes into which it splits, approximately one sixth of the circumference.

Figure 2:
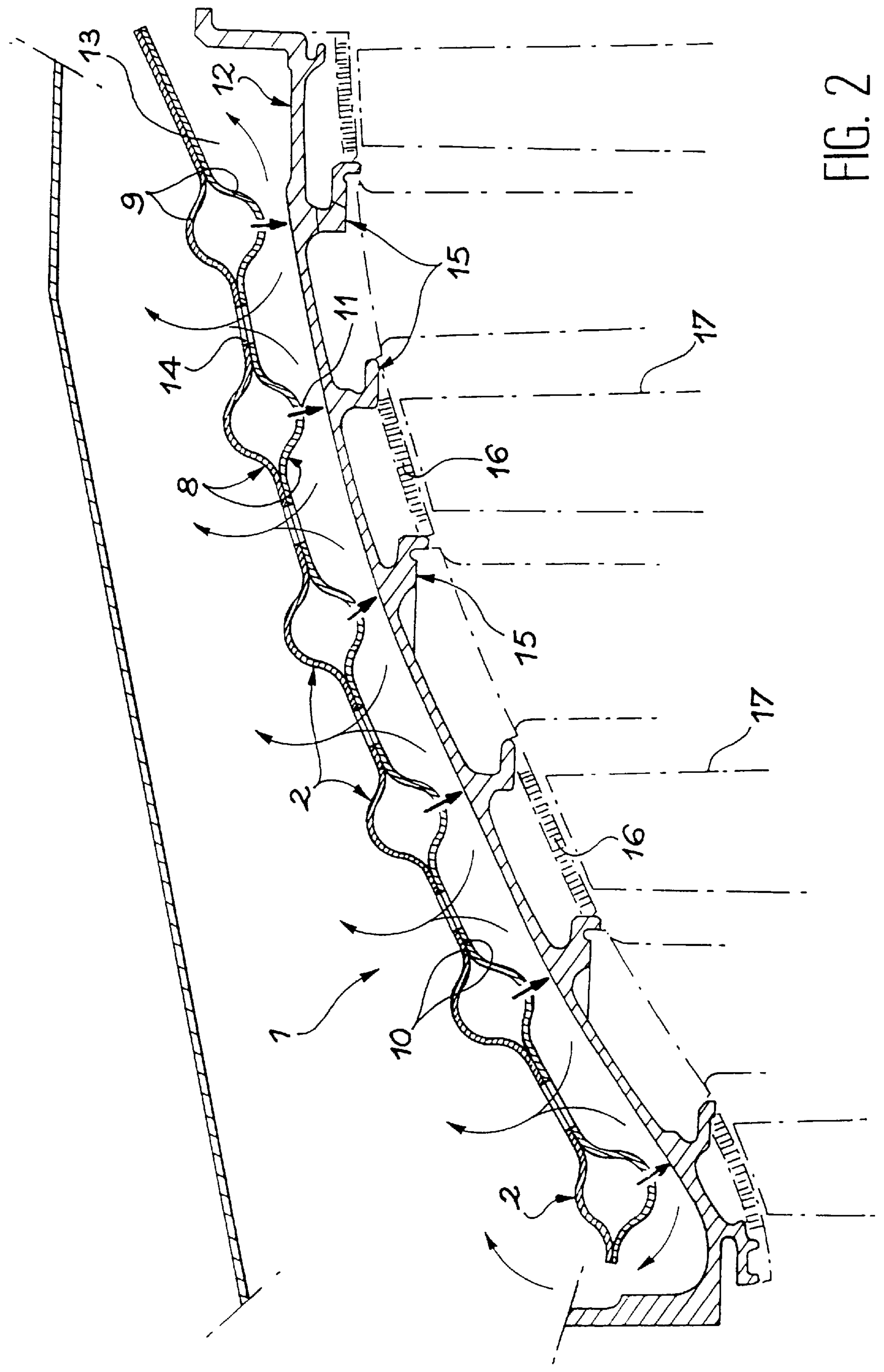
FIG. 2 is a section through the networks of tubes showing how they are manufactured and located.

FIG. 2 shows how the networks of tubes 1 consist of corrugated sheet metal 8 positioned and joined so that their undulations 9 are opposed and brought together to form tubes 2. The corrugated metal sheets 8 include flat common sections 10 between the corrugations 9; these flat sections are in contact when the corrugated metal sheets 8 are assembled and riveted or fastened together by other means. The tubes 2 are fitted with apertures 11 that face the housing 12 so that the heating or cooling gas is blown onto it. The gas accumulates in an annular chamber 13 formed by the housing 12 and the networks of tubes 1 but escapes via additional apertures 14 formed in common sections 10. The hooks 15 of the housing 12 are shown; these hooks are circular ribs to which the segments of rings bearing the fixed blades and surfaces 16 covered with an abradable layer that surround the movable blades 17 of the rotor. Since the hooks 15 are the sections of the housing 12 that directly determine the play on the ends of the blades, it is practical if each tube 2 and its blowing aperture 11 is located facing one of the hooks.

Figure 3:
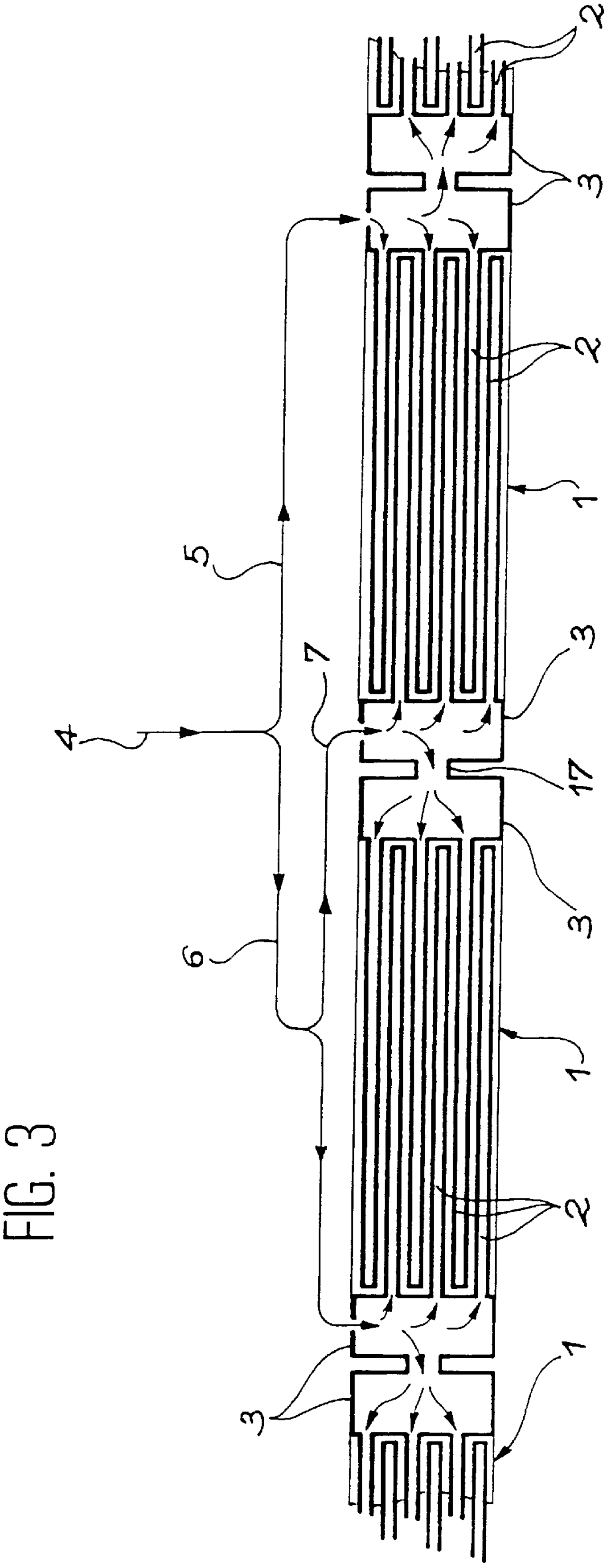
FIG. 3 is a flat representation of the apparatus designed to explain its operation.

FIG. 3 shows how each gas distribution pipe opens into one of the adjacent pairs of distributor units 3 described above. It also shows how their contents first fill the said distributor units 3 before half passes into the other distributor unit 3 via sleeve 17 that connects them. The six tubes 2 of tube networks 1 are alternately connected to one of the opposing distributor units 3 located on the ends of the networks so that the gas flows in one direction in three of the tubes 2 and in the opposite direction in the three other tubes 2. The gas is heated in the tubes 2 in the same way as in the previous apparatus and exits via the apertures 11 at temperatures that increase the further away they are from the distributor units. Consider a generating line on the surface of housing 12: it receives gas from three tubes 2 that have traveled a relatively long distance and the gas from three tubes 2 that have traveled a relatively short distance, i.e. gas that has been greatly heated and gas that has been only slightly heated, therefore carrying a quantity of heat that is virtually uniform; the aim of the invention is thus achieved.

Figure 4:
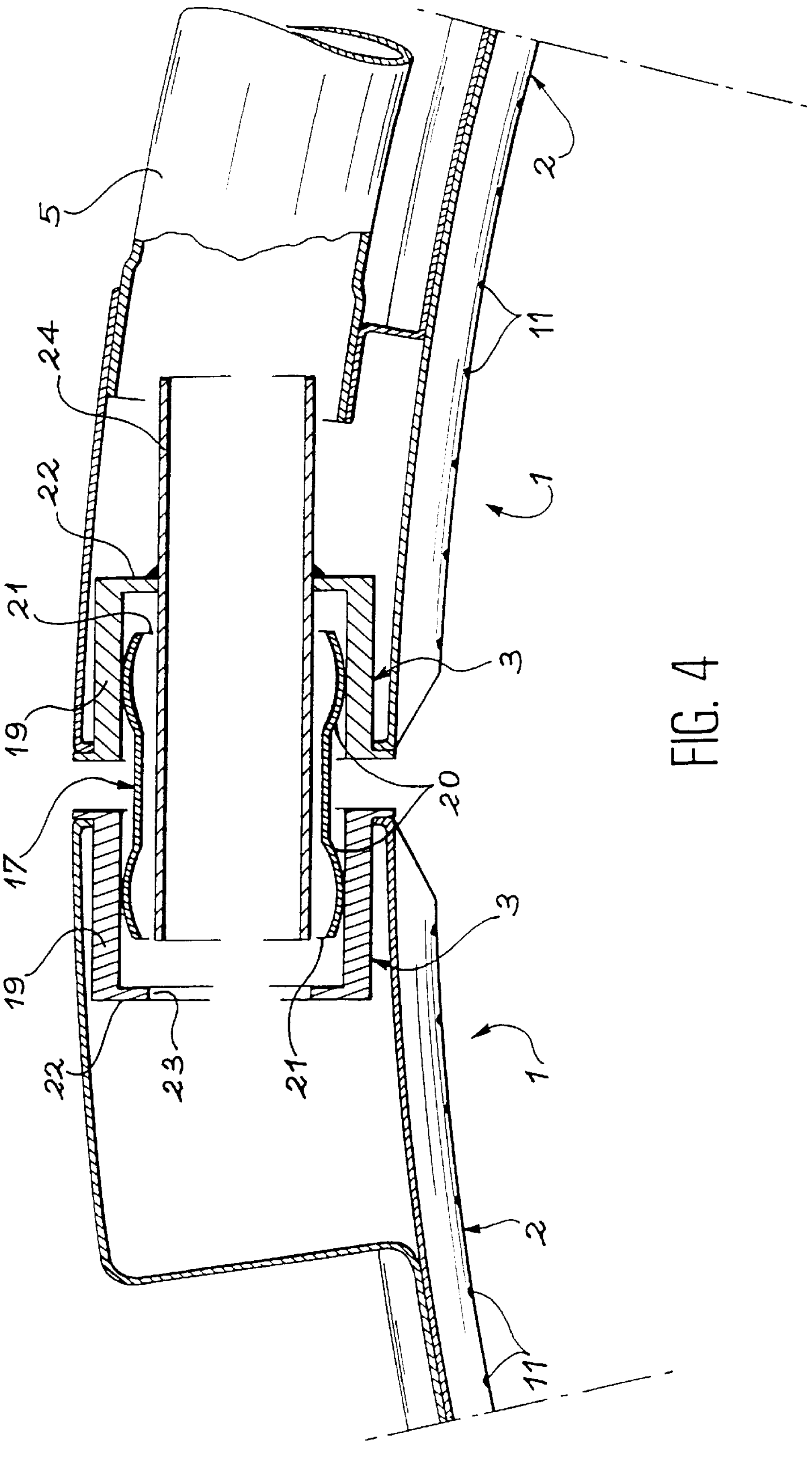
FIG. 4 shows how the distributor units are connected.

The connection between adjacent distributor units 3 supplied by the same pipe will now be described. Turning back to FIG. 1, it will be seen that the outer surfaces of distributor units 3 have protuberances 18 extending them and that supply pipes such as 5 and 7 terminate in line with said protuberances 18 and penetrate one of them. As can be seen from FIG. 4, each protuberance 18 contains a bush 19 that partially delimits it, the bushes 19 being installed facing one another and connected by one of the sleeves 17. The two ends of sleeve 17 are fitted with spherical sections 20 that are open at the ends 21 and capable of sliding on the inner surface of the bushes 19. The networks of tubes 1 and the bushes 19 may therefore move in relation to one another without causing more than one rotation or sliding movement of the sleeve 17 in the bushes 19 and without the leak tightness and connection between the distributor units 3 being broken. Clearly sleeve 17 must be inserted sufficiently far into the bushes 19 to prevent it coming out even if the networks of tubes 1 separate. The bushes 19 are also fitted with stop surfaces 22 on either side of the sleeve 17 that prevent it from moving indefinitely in a single direction. The stop surfaces 22 comprise a central aperture 23 to allow inlet of gas into the distributor units 3. A connecting tube 24 is welded to one of these apertures 23 while the other aperture is left free. Connecting tube 24 is butt-welded to half the cross-section of a supply pipe such as 5; this allows half the gas to flow into the opposite distributor unit 3 (on the left of the figure) via connecting tube 24 while the other half of the gas strikes the bush 19 and is driven back into the tubes 2 of distributor 3 to the right. In a final improvement, the flow of gas may be controlled by a creeper valve 25 controlled by a computer 26 according to the speed attained, thereby adjusting the flow of gas supplied to the apparatus and thus the degree of dilation undergone by housing 12. The computer 26 may receive data from sensors measuring levels of speed, temperature, pressure etc. present in the machine; it exploits this data using empirically-devised tables or formulae. Finally, Figure 27 is the point on feed-pipe 4 at which the gas can be sampled. This is usually a point on the exhaust gas pipe from which part of the flow is sampled using means well known in the art.

Three networks of tubes 1 are shown, but a different number of networks, running over corresponding fractions of the circumference of the housing 12 is also possible. The tubes are shorter if there are many networks; this limits the distance the gas travels and therefore the degree to which it is heated. But the characteristics of the invention overcome the consequences of this heating to the extent that it is pointless splitting up the apparatus any more.

The invention can be particularly applied to turbomachines in which gases hotter than elsewhere make it more necessary.

What is claimed is:

1. A Cooling or heating apparatus for a circular housing, comprising:

networks of tubes covering different sections of a circumference of the housing, the tubes having gas outlet apertures directed to the housing;

gas inlet distributors each of which has a bush and is provided at an end of each of the networks so that each of the networks is provided between and connected to two of the gas inlet distributors;

gas supplying pipes each of which is configured to supply gas to two adjacent of the gas inlet distributors;

sleeves each of which is inserted into the bushes of the two adjacent of the gas inlet distributors to connect one of the gas inlet distributors of one of the networks and one of the gas inlet distributors of another one of the networks such that the networks are connected to each other by the sleeves, each of the sleeves being slidable in the bushes and having ends each of which has a shape of a portion of an open sphere, the bushes having an end-stop to limit a movement of the sleeve; and connecting pipes each of which is provided in each of the sleeves to pass through the end-stop of one of the bushes to open into each of the gas supplying pipes such that a cross-sectional area of each of the connecting pipes overlaps a half of a cross-sectional area of each of the gas supplying pipes.

2. The Cooling or heating apparatus of claim 1, wherein each of the networks of tubes comprises corrugated metal sheets which have corrugations and are fastened by flat common sections between the corrugations, the tubes are formed by the corrugations, and the common sections have apertures through which the gas is expelled.

3. The Cooling or heating apparatus of claim 1, wherein there are three networks of tubes.

4. The Cooling or heating apparatus of claim 1, wherein the gas supplying pipes comprise a creeper valve which is controlled by a computer.

* * * * *